(12) United States Patent
Kaertner et al.

(10) Patent No.: US 7,940,390 B2
(45) Date of Patent: May 10, 2011

(54) COMPACT BACKGROUND-FREE BALANCED CROSS-CORRELATORS

(75) Inventors: Franz X. Kaertner, Newton, MA (US); Franco N. C. Wong, Lexington, MA (US); Jung-Won Kim, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 831 days.

(21) Appl. No.: 11/947,544

(22) Filed: Nov. 29, 2007

(65) Prior Publication Data

US 2010/0045974 A1 Feb. 25, 2010

Related U.S. Application Data

(60) Provisional application No. 60/867,998, filed on Nov. 30, 2006.

(51) Int. Cl.
*G01J 1/10* (2006.01)
*H01S 3/10* (2006.01)

(52) U.S. Cl. ......... 356/365; 356/229; 356/218; 372/21; 372/25; 250/339.06

(58) Field of Classification Search ................. 356/218, 356/229; 372/30, 27, 61, 21, 25
See application file for complete search history.

(56) References Cited

U.S. PATENT DOCUMENTS 3,520,616 A 7/1970 Glenn et al.
4,413,095 A 11/1983 Mizuno et al.

FOREIGN PATENT DOCUMENTS

GB 2 175 084 A 11/1986
GB 2 210 194 A 6/1999

OTHER PUBLICATIONS

Langrock, Carsten et al., "Background-Free Collinear Autocorrelation and Frequency-Resolved Optical Gating Using Mode Multiplexing and Demultiplexing in Aperiodically Poled Lithium Niobate Waveguides", *Opt. Lett. 32*, (2007),2306-2308.
Fiorentino, Marco et al., "Spontaneous Parametric Down-Conversion in Periodically Poled KTP Waveguides and Bulk Crystals", *Opt. Express 15*, (2007),7479-7488.
Kim, Jungwon et al., "Attosecond-resolution timing jitter characterization of free-running mode-locked lasers", *Opt. Lett. 32*, (2007),3519-3521.
Kim, Jungwon et al., "Long-term femtosecond timing link stabilization using a single-crystal balanced cross correlator", *Opt. Lett. 32*, (2007),1044-1046.
European Patent Office, "International Search Report and Written Opinion of the International Searching Authority", PCT/US2007/085951 (corresponding PCT application), (Nov. 24, 2008).

*Primary Examiner* — L. G Lauchman
(74) *Attorney, Agent, or Firm* — Modern Times Legal; Robert J. Sayre

(57) ABSTRACT

A compact, background-free, balanced cross-correlator enables (a) the detection of a timing error between two ultrashort pulses with (sub-)femtosecond resolution and (b) the timing synchronization of ultrashort pulse lasers using the output signal of the detector to close a phase-locked loop and can therefore serve as an integral part of femtosecond timing distribution and synchronization systems.

36 Claims, 16 Drawing Sheets

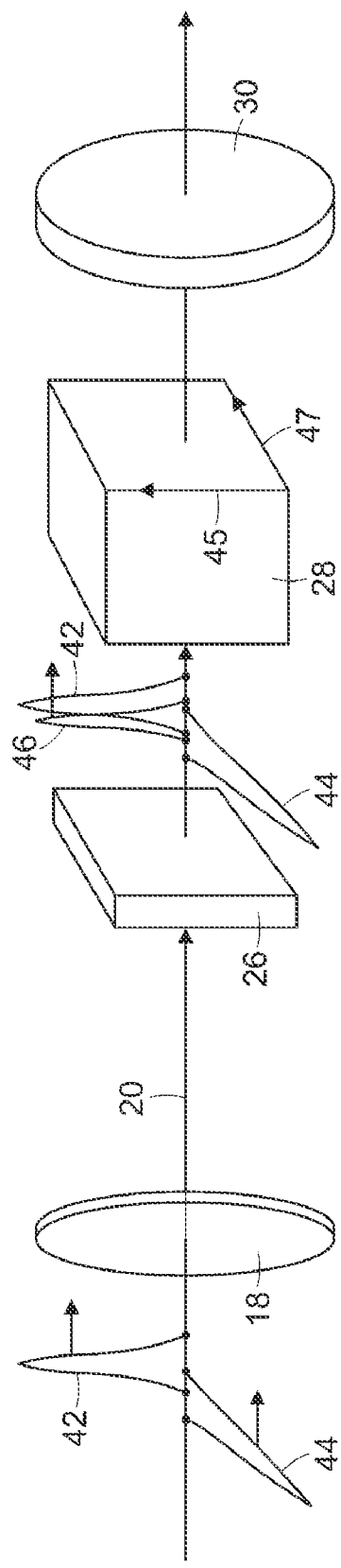
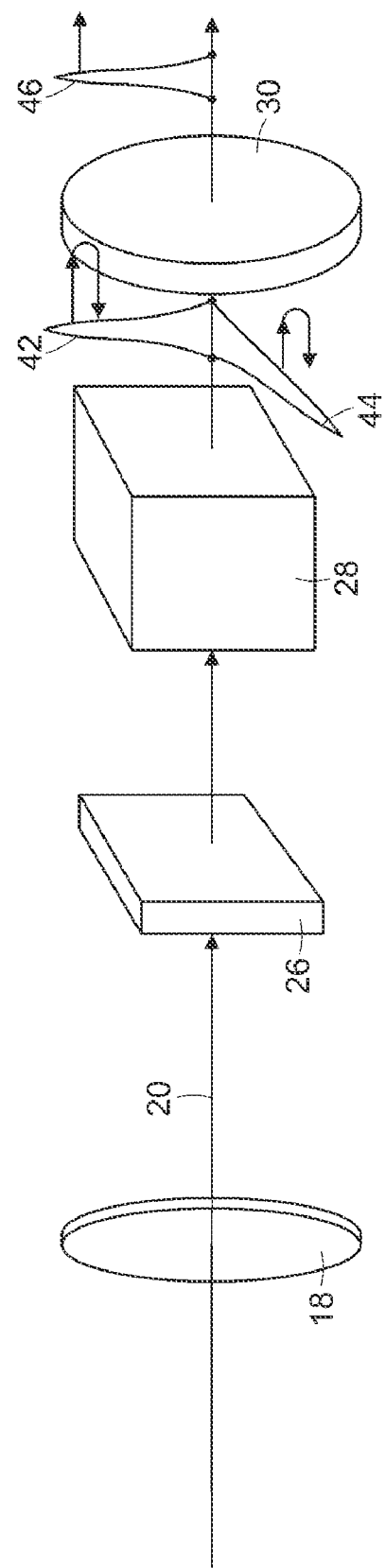
FIG. 2
FIG. 3

COMPACT BACKGROUND-FREE BALANCED CROSS-CORRELATORS

RELATED APPLICATION

This application claims the benefit of U.S. Provisional Application No. 60/867,998, filed Nov. 30, 2006, the entire content of which is incorporated herein by reference.

GOVERNMENT SUPPORT

The invention was supported, in whole or in part, by a grant, N00014-02-1-0717 from the Office of Naval Research. The United States Government has certain rights in the invention.

BACKGROUND

Balanced cross correlation was previously implemented for optical pulses with different center wavelengths [see T. R. Schibli, et al., Opt. Lett. 28, 947 (2003)]. Using group delay dispersion (GDD) to vary the group delay between two pulses of different center frequency, this balanced cross-correlator was used to lock two independently mode-locked lasers with different optical spectra within 300 attoseconds residual timing jitter. Recently, it has also been shown that this method enables long-term (i.e., for a period greater than 12 hours) sub-femtosecond timing synchronization (see J. Kim, et al., "An Integrated Femtosecond Timing Distribution System for XFELs," European Particle Accelerator Conference 2006). However, this method is limited to the case of optical pulses with different center wavelengths because the delay between the two pulses was generated by the group delay dispersion and because the balanced optical cross correlator used two nonlinear media. This method is not applicable to the case in which the two optical pulses have the same center wavelength.

In this case and in general, one can use fast photodiodes followed by a microwave mixer to extract the timing information, but the resolution and stability of this method are very limited due to the limited resolution and drifts of microwave mixers. Applicants believe that, thus far and beyond the methods described herein, no pure electronic method has achieved long-term (i.e., greater than 12-hour) stable sub-100 femtosecond resolution in the timing detection between two optical pulses.

SUMMARY

Disclosed herein are means and methods for an extremely precise detection of the timing error between two ultrashort laser pulses with femtosecond or sub-femtosecond resolution using a single nonlinear medium and a group dispersion/delay element. The non-linear medium produces a sum-frequency component, and the group dispersion/delay element changes the relative positions of the first and second input pulses. In particular embodiments, the non-linear medium and the group dispersion/element are the same medium. By use of a balanced detection scheme, this approach is insensitive to the amplitude noise from the laser sources and, with long-term stability, is able to extract only the timing error.

Two possible implementations are discussed in detail. In the first implementation, the steps include (a) generation of a group delay difference between two pulses with the same polarization but different center frequency due to the dispersion of the material and (b) generation of the sum frequency component by a type-I phase-matched nonlinear crystal. In the second implementation, the steps include (a) generation of a group delay difference between two orthogonal polarized pulses or between pulses in general different spatial mode and (b) generation of the second-harmonic or sum-frequency component by a type-II phase-matched nonlinear crystal.

In both cases, the detected signal is background-free; i.e., if the pulses do not overlap in time, the detector signal is vanishing. In particular, in the second implementation, using the group delay from the polarization difference enables implementation of balanced cross-correlation in the same wavelength range, which is believed not to have been previously achieved. The group delay and second-harmonic/sum-frequency functions can also be combined in a single nonlinear crystal. This combination allows a self-aligned operation as well as integration in a single optoelectronic device or on an optoelectronic chip. Amongst many applications, these balanced cross-correlation methods and apparatus are applicable to each of the following: (a) laser-laser synchronization, (b) timing-link stabilization, (c) phase-noise measurements of free-running mode-locked lasers, and (d) optical-timing detection, in general.

BRIEF DESCRIPTION OF THE DRAWINGS

FIGS. 2-4 provide an illustrative example of the single-crystal balanced cross-correlator, wherein input pulses have the same center wavelength and orthogonal polarizations.

Figure 1:
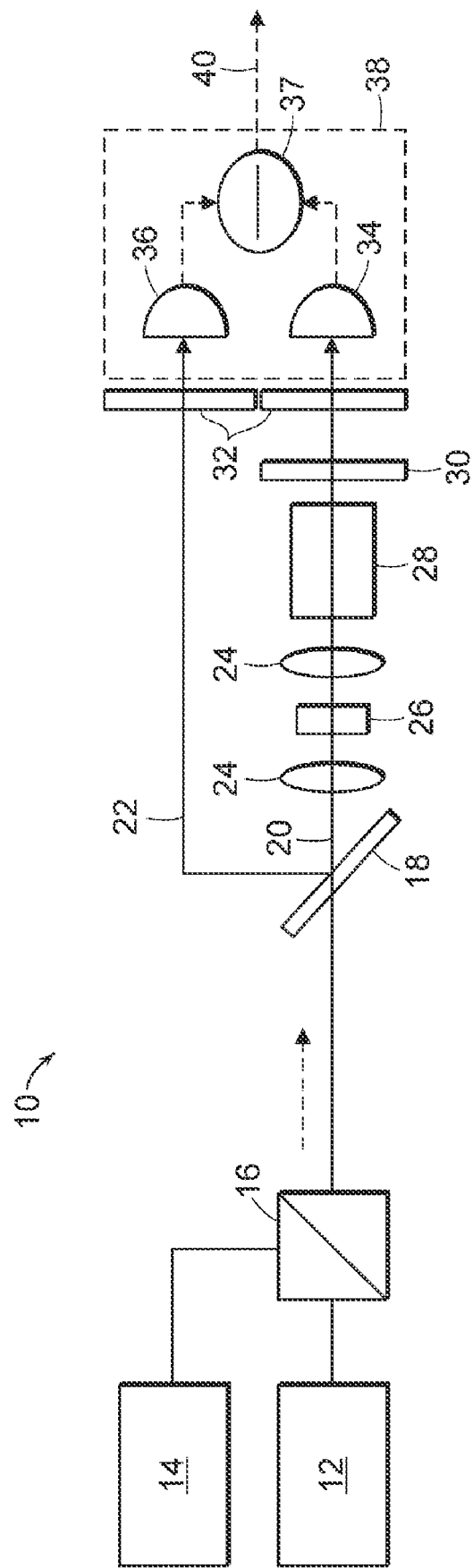
FIG. 1 is a schematic illustration of a single-crystal balanced cross-correlator.

The foregoing and other features and advantages of the invention will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

A basic schematic illustration of a cross-correlator of this disclosure is illustrated in FIG. 1. This apparatus can be utilized for the following two different cases: (i) pulses with the same polarization but different center wavelength and (ii) pulses with orthogonal polarization or in general different spatial mode. Each of these cases is described, below, under a separate subheading. The pulses in each case can have pulse-widths in the range of 10 femtoseconds (fs) to 10 picoseconds (ps).

(i) Pulses with the Same Polarization but Different Center Wavelength:

For the first case, pulses with the same polarization but different center wavelengths are applied to a cross-correlator 10. The input pulses from first and second lasers 12 and 14 are combined at a beam splitter 16 and transmitted through an off-axis dichroic beam splitter (mirror) 18, which is angled at 45° with respect to the path of the transmitted pulses to reflect pulses of higher frequencies out of the joint optical path 20 into an extension optical path 22, while transmitting the input pulses for a first pass through the joint optical path 20 of the optical pathways. Traveling left-to-right in FIG. 1, the input pulses are then focused (with lenses 24) into a nonlinear medium 26, which, in this case, is a type-I phase-matched sum-frequency generation (SFG) nonlinear crystal (such as periodically poled lithium niobate) to produce a first-pass sum-frequency component. The pulses then pass through a group dispersion/delay element 28, which can be, for example, a piece of fused quartz. As used herein, a "group dispersion/delay element" (a) produces a group delay via dispersion when pulses with different wavelengths are provided and/or (b) produces a group delay via birefringence when pulses with different polarizations or occupying different waveguide modes are provided.

The generated first-pass sum-frequency component and possible second-harmonic components of the individual pulses are then transmitted through an inline dichroic mirror 30. The generated sum-frequency component is filtered by a bandpass filter 32 and detected by a first photodiode 34 in the balanced detector 38. The bandpass filter 32 passes only the sum-frequency component and blocks the fundamental beams. Typically, the SFG process efficiency is quite low (<1%), and most of the fundamental beam passes through the crystal. Without this filter, the photodiodes may be saturated by the fundamental beams.

The inline dichroic mirror 30 reflects the remaining fundamental input pulses back in the reverse direction (within the joint optical path 20 toward the left in FIG. 1), and the fundamental input pulses are again focused into the nonlinear crystal 26 to generate a second-pass sum-frequency component. Before being focused, the input pulses experience an additional group delay in the group dispersion/delay element 28 by the index difference at the two different center wavelengths. The group dispersion/delay element 28 serves to change the relative positions of the two combined pulses. Next, the sum-frequency component and possible second-harmonic components of the individual pulses are separated by the 45-degree off-axis dichroic beam splitter 18, wherein the off-axis beam splitter 18 reflects the sum-frequency and second-harmonic components to the extension optical path 22, which leads to the top filter 32. Only the sum-frequency component passes the filter 32 and is then detected by the second photodiode 36 in the balanced detector 38. A differential amplifier 37 is coupled at a central location in series between the two photodiodes 34 and 36 and generates an output signal 40 with a current equal to the difference in the current of the signals generated by the two photodiodes 34 and 36. The output signal 40 is transmitted through the output of the balanced detector 38, where it is extracted; the voltage or current of the output signal 40 is accordingly proportional to the relative position between the two input pulses 42 and 44.

(ii) Pulses with Orthogonal Polarization or, in General, with Different Spatial Modes:

In the second case, combined pulses with orthogonal polarizations are applied to the cross-correlator 10. Entering from the left, as shown in FIG. 1, the input pulses are transmitted through the off-axis dichroic beam splitter 18. The off-axis beam splitter 18 transmits the input pulses but reflects the second harmonic (if the input pulses have the same center wavelength) or the sum frequency (if the input pulses have different center wavelengths) of the input pulses. The pulses are then focused into a non-linear medium 26, which in this case is a type-II phase-matched nonlinear crystal (such as periodically poled potassium-titanyl-phosphate), and then passed through the group dispersion/delay element 28. The generated first-pass second-harmonic/sum-frequency component is then transmitted through the inline dichroic mirror 30, which reflects the fundamental input pulses. The generated second-harmonic/sum-frequency light is detected by a photodiode 34 in the balanced detector 38.

The remaining fundamental input pulses are reflected back by the inline dichroic mirror 30 and are again focused into the nonlinear crystal 26. Before being focused, the input pulses experience a group delay in the group dispersion/delay element 28 based on the index difference between the two orthogonal polarizations. Consequently, the relative positions of the two combined pulses are changed. The second-pass second-harmonic/sum-frequency component generated by the back-reflected pulses is separated by the 45-degree dichroic beam splitter 18 via reflection into the upper optical path and detected by the photodiode 36 in the balanced detector 38. When the wavelengths of the incoming pulses are the same, the filters 32 are eventually unnecessary. When the wavelengths of the incoming pulses differ, only sum-frequency components pass through the filters 32.

At the output of the balanced detector 38, a voltage or current signal 40 proportional to the relative position between the two input pulses is extracted. Where the pulses have the same wavelength in type-II phase matching and where the two input pulses are orthogonal, the individual pulses do not generate any meaningful second-harmonic component because the copolarized second-harmonic component is not phase matched. Hence, type-II phase matching yields a background-free, second-harmonic or sum-frequency output signal—even in the collinearly propagating configuration, which permits the use of non-critical-angle phase matching for more-efficient and more-convenient nonlinear signal generation.

Figure 4:
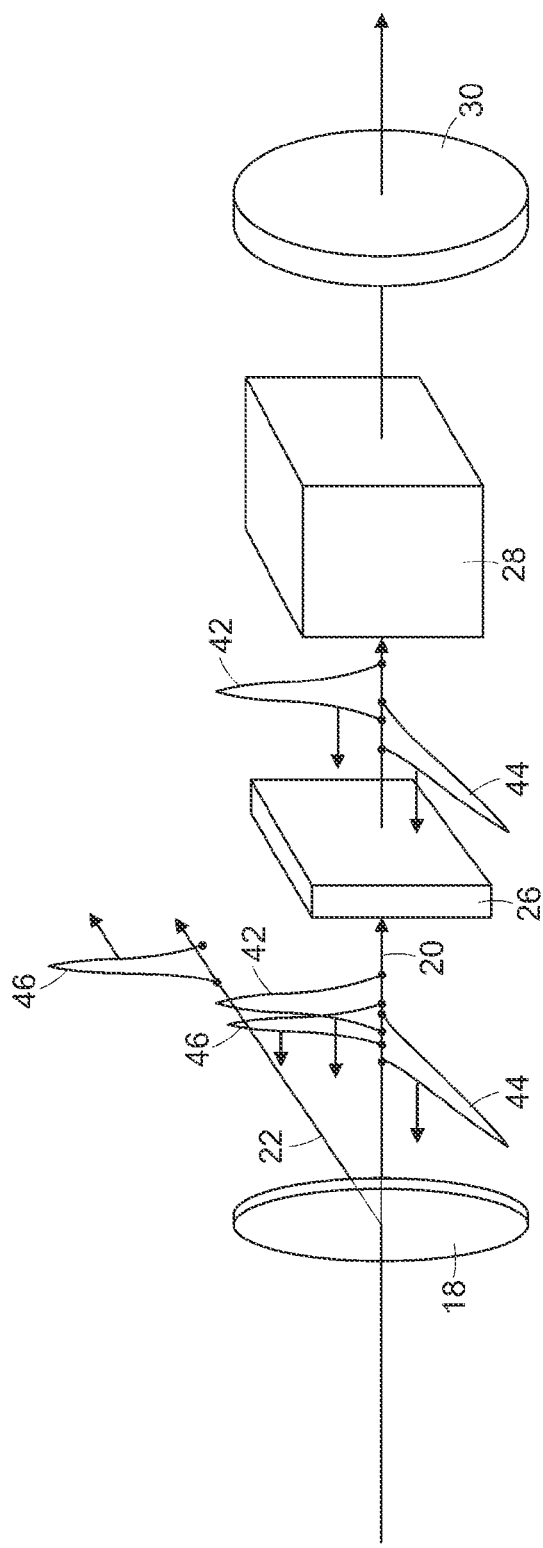

As an illustrative example, FIGS. 2-4 show the various steps of the process for the case of identical center wavelength pulses. In FIG. 2, the non-linear medium 26 is a type-II phase-matched second-harmonic generation (SHG) crystal. The SHG crystal generates a second-harmonic component 46 from forward input pulses 42 and 44 (i.e., moving left-to-right, as illustrated). The input pulses 42 and 44 and the second-harmonic component 46 then pass through a dispersion element 28, which, in this embodiment, is a birefringent material with its slow axis 45 oriented vertically and its fast axis 47 oriented orthogonally with respect to the page, as illustrated.

In a subsequent stage, illustrated in FIG. 3, the second-harmonic component 46 that was generated by the first pass of the forward input pulses 42 and 44 through the non-linear medium 26 (in FIG. 2) is transmitted through an inline dichroic mirror 30 to the balanced detector in the joint optical path 20. The remaining forward input pulses 42 and 44 are back reflected by the inline dichroic mirror 30. Due to the birefringence of the group dispersion/delay element 28, the relative position of combined input pulses 42 and 44 is changed (in this case, their lead-follow order is reversed). Subsequently, in FIG. 4, the backward input pulses 42 and 44 (i.e., now moving right-to-left, as illustrated, with different relative positions) generate a second-harmonic component 46. This second-harmonic component 46 is separately reflected by a 45-degree off-axis dichroic beam splitter 18 into the extension optical path 22 and applied to the second photodiode 36 in the balanced detector 38.

Figure 5:
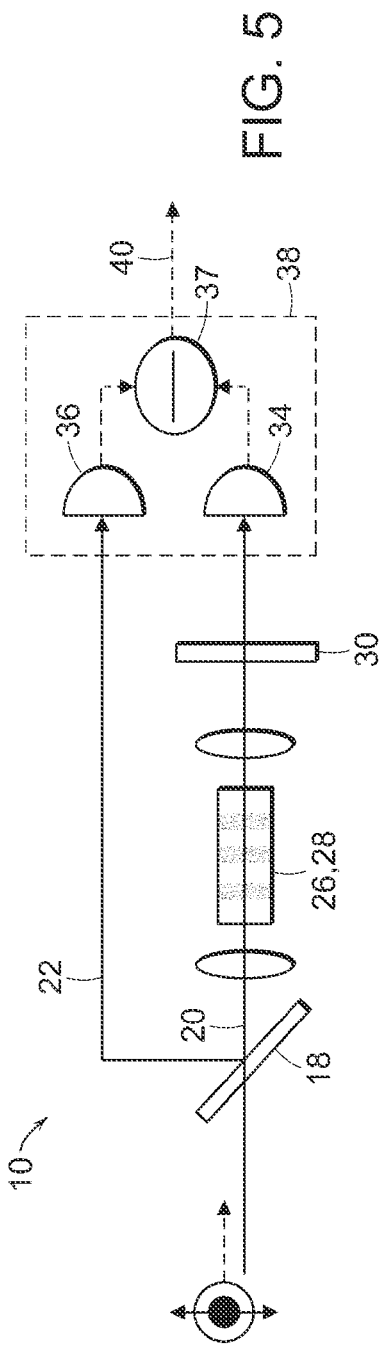
FIG. 5 illustrates a single-crystal balanced cross-correlator based on a type-II phase-matched periodically poled nonlinear crystal.
Figure 6:
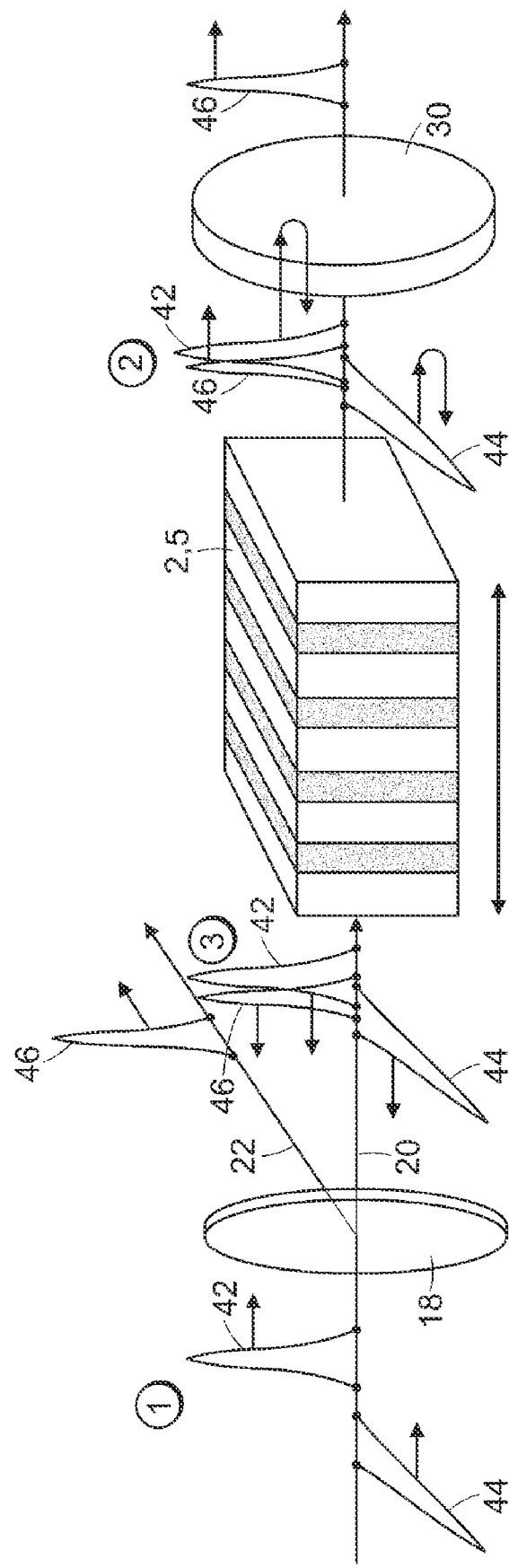
FIG. 6 illustrates operation of the balanced cross-correlator based on a type-II phase-matched periodically poled nonlinear crystal.

In another embodiment, the functions of the non-linear medium and the group dispersion/delay element can be combined in a single phase-matched crystal if the pulse width and the group delay difference achievable in the phase-matched crystal are compatible with the cross correlation. This combination enables an alignment-free implementation of the general concept in a very compact embodiment. In addition, with the advance of fabrication technology, this balanced cross-correlator can be implemented with a Type-II phase-matched periodically poled nonlinear crystal serving as both the nonlinear medium 26 and the group dispersion/delay element 28 or on a chip with a waveguide-type periodically poled nonlinear crystal. FIGS. 5 and 6 show the apparatus and the operation of this implementation for the case of equal center wavelength pulses and orthogonal input polarizations. The combined nonlinear medium/group dispersion/delay element 26 and 28 provides a group delay, $T_g$, between the orthogonal polarizations.

In another embodiment, the nonlinear crystal can be replaced by a periodically poled potassium-titanyl-phosphate (PPKTP) waveguide [see M. Fiorentino, et al., "Spontaneous Parametric Down-Conversion in Periodically Poled KTP Waveguides and Bulk Crystals," Optics Express, v. 15, 7479-7488 (2007)]. Alternatively, the waveguide can be an aperiodically poled lithium niobate waveguide. The free-standing dichroic mirrors can be replaced by appropriate coatings on the crystal, and the fundamental and second harmonic light can be coupled to and from the waveguide by optical fibers and wavelength-division multiplexing (WDM) couplers. In particular embodiments, the nonlinear medium can be contained in a waveguide, e.g., by filling a hollow-core waveguide fiber with the nonlinear medium. In other embodiments, the waveguide can be fabricated in the nonlinear medium, e.g., by proton exchange to increase to define a light-guiding region bound by high refractive index.

Instead of using orthogonal polarizations to suppress the second-harmonic background-signal generation of the individual pulses and to control the group-velocity difference for the two pulses, the two pulses can, in general, be simply in two different spatial modes, such as different transverse modes of a waveguide. The mode-dispersion and nonlinear interactions between the modes can be engineered to achieve the same objectives as are achieved in the case of the different polarizations [see, for example, C. Langrock and M. M. Fejer, "Background-Free Collinear Autocorrelation and Frequency-Resolved Optical Gating Using Mode Multiplexing and Demultiplexing in Aperiodically Poled Lithium Niobate Waveguides," Opt. Lett. 32, 2306 (2007)]. For example, the nonlinear medium (e.g., lithium niobate) can be configured with mode-multiplexing, asymmetric Y-junction inputs and outputs, as described in the above-cited Langrock article, wherein the first and second input pulses are directed through different inputs into the nonlinear medium such that the pulses adopt different spatial modes through the nonlinear medium.

Exemplification

Figure 7:
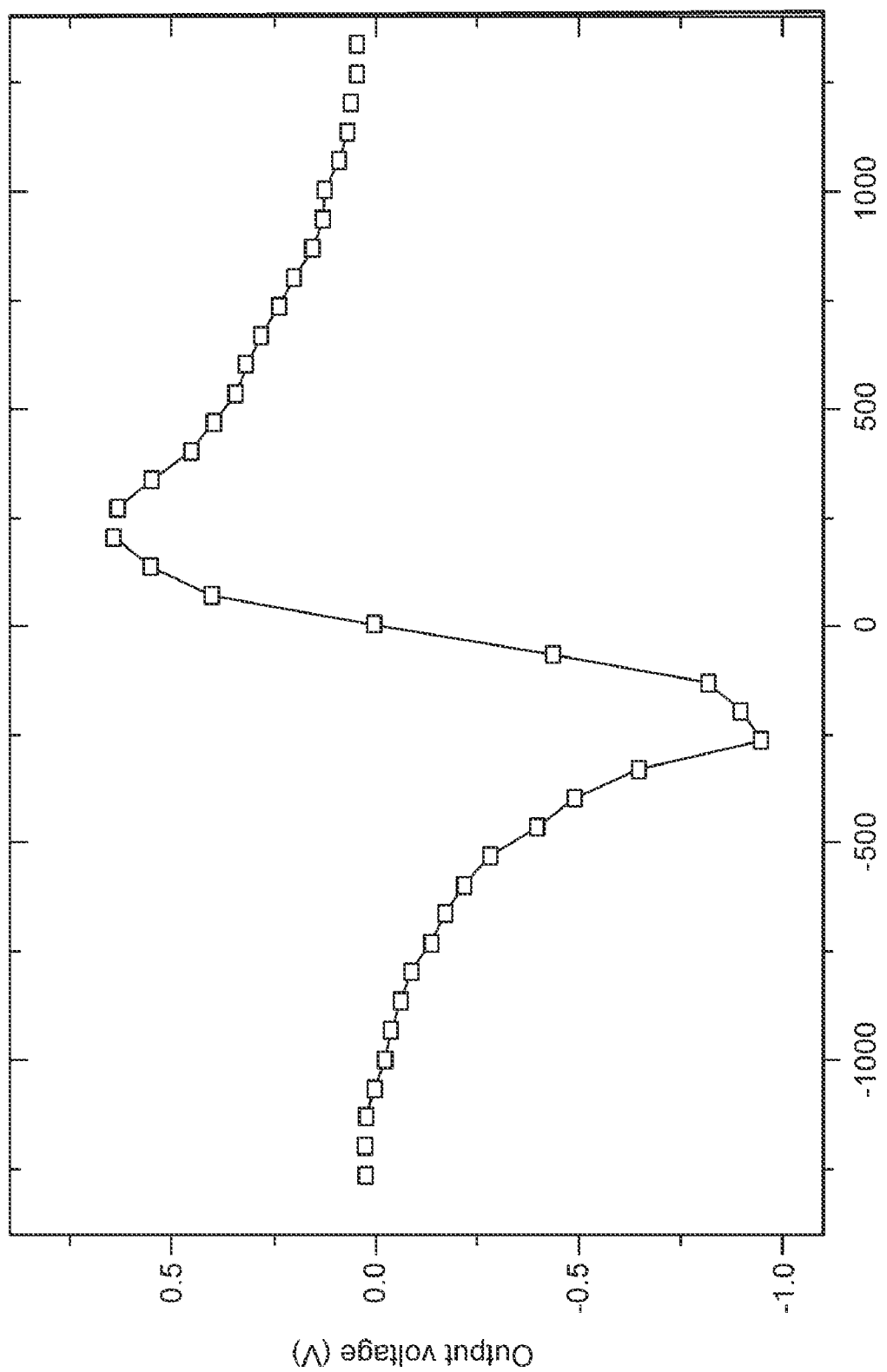
FIG. 7 charts the output measurement of the type-II phase-matched PPKTP balanced cross-correlator.

A demonstrative experiment using the above-described apparatus was performed with a 1550-nm stretched-pulse fiber laser as a pulse source (with a pulsewidth of approximately 150 fs) and a 5-mm-long periodically poled potassium-titanyl-phosphate (PPKTP) crystal with a poling period of 46.2 μm as the nonlinear medium. FIG. 7 shows the output from the balanced detector as a function of the delay between the input pulses.

Representative Applications

The following list provides a few applications for the invention, though many others are possible. For simplicity, the center wavelength of the input pulses is assumed to be 1550 nm in all cases.

Figure 8:
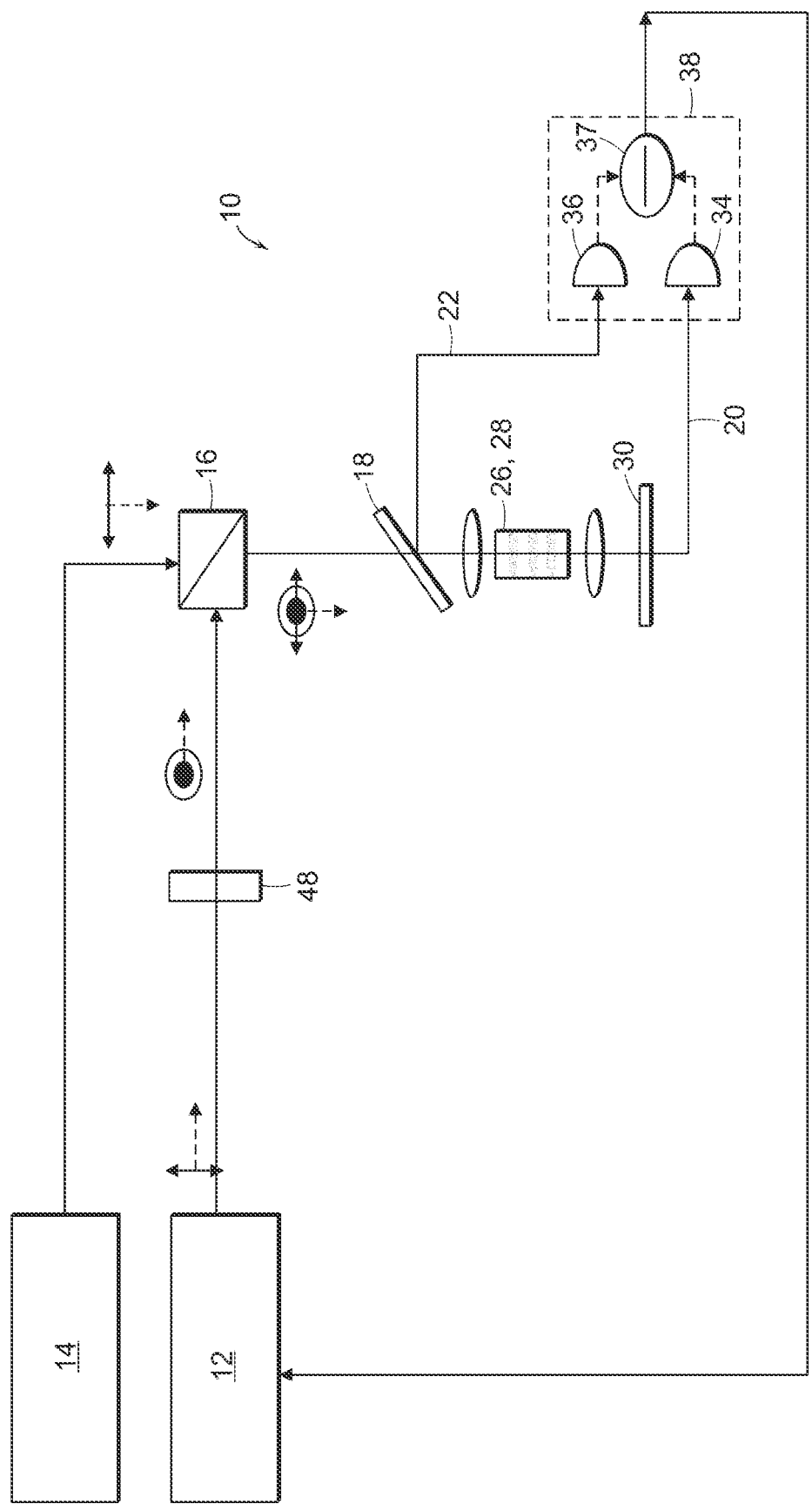
FIG. 8 illustrates synchronization of two lasers operating at the same center wavelength.

1) Synchronization of Two Lasers Operating at the Same Center Wavelength:

Use of the cross-correlator 10 to synchronize two mode-locked lasers 12 and 14 is illustrated in FIG. 8. The pulse from the first laser 12 is passed through a half-wave plate (HWP) 48, which changes the polarization of the pulse by 90°. The pulses from the two lasers 12 and 14 are joined in a polarizing beam splitter 16 to produce combined input pulses with orthogonal polarizations and are then directed through a dichroic beamsplitter 18 (that reflects a 775 nm component and that transmits a 1550 nm component) into a cross-correlator apparatus 10, in which the fundamental input pulses are reflected by a dichroic mirror 30 that reflects a 1550 nm component and transmits a 775 nm component. The output from the balanced detector 38 is utilized to change the repetition rate of the first laser 12, e.g., with a piezoelectric actuator. The piezoelectric actuator, which changes its length when a voltage is applied, is mounted to one of the mirrors forming the laser cavity such that, when a feedback signal (as a form of voltage signal) is applied to the piezoelectric actuator, the actuator displaces the mirror to change the laser-cavity length. This change in cavity length leads to a change in the repetition rate because the repetition rate is determined by $f=2 L/c$, where L is the cavity length and c is the velocity of light.

This change in the laser-repetition rate leads to a reduction of the distance between the two pulses. Readings from the balanced detector 38 can be matched with the distance between the laser pulses and matched with a plot, as shown in FIG. 7, to reach a zero output voltage, which indicates that the two lasers 12 and 14 are synchronized.

2) Timing Link Stabilization:

For timing distribution in next-generation advanced accelerators and fourth-generation light sources, such as x-ray free-electron lasers and advanced large-scale radio antenna arrays, femtosecond timing distribution over distances of a few kilometers needs to be achieved. For that purpose, an optical signal containing the timing information is transmitted to all timing-critical locations in those facilities over length-stabilized fiber links.

Figure 9:
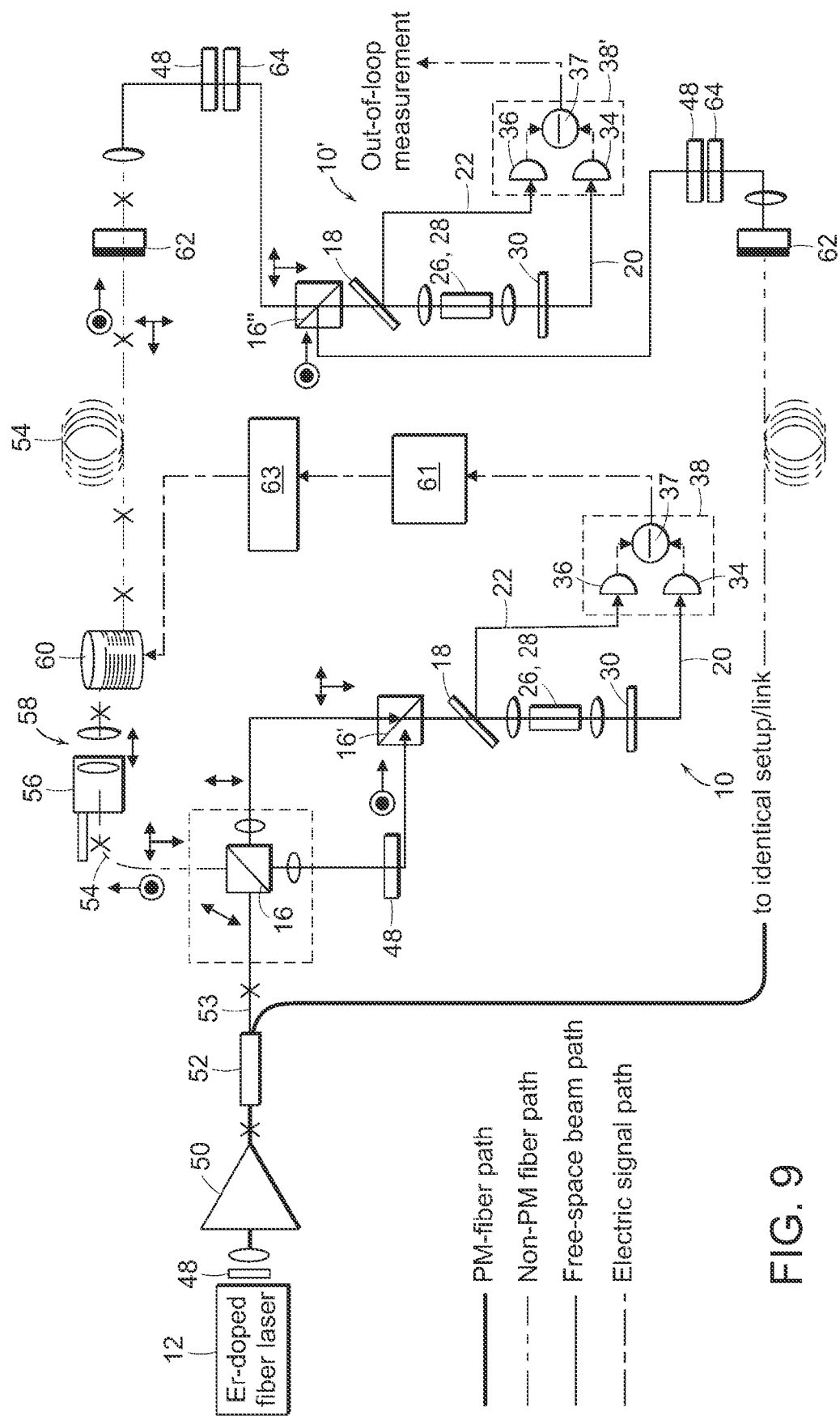
FIG. 9 illustrates stabilization of a timing link.

The length stabilization can be achieved with the cross-correlator described herein, as shown in FIG. 9. The output pulse train of a low-noise mode-locked laser 12 is passed through a half-wave plate 48, an erbium-doped fiber amplifier 50, and a 50/50 polarization-maintaining coupler 52 into a fiber link 53. At the input of the fiber link 53 is a polarizing beam-splitter cube 16; the input light is polarized at 45°. The output from the top of the polarizing beam-splitter cube 16 is sent into fiber link 54.

Fiber link 54 has two adjustable-length sections 58 and 60. The first adjustable-length section 58 is motorized with nano-precision stages that can easily take out all slow-but-large long-term drifts in fiber length and is in the form of a fine-tunable free-space section of variable length. The collimator 56 transforms the beam from the fiber into a 1-mm large mode so that it stays collimated over the free-space section 58 and can then be coupled back into the fiber. If the fiber expands due to temperature, the free-space section is properly reduced to maintain the same travel time over the fiber link 54. Accordingly, drifts in length up to several centimeters can be easily taken out, and only a very coarse temperature stability of the fiber link 54 needs to be maintained ($\Delta T \sim 1\text{-}5°$ C.).

Next, the pulse train passes through the second adjustable-length section 60, which is in the form of a short fiber stretcher and which has a bandwidth of up to 10 kHz for taking out the high-frequency noise or short-term fluctuations in the fiber. The fiber link 54 (up to several kilometers in length) is laid out in a dispersion-compensated fashion. At the end of the fiber link 54, the pulse hits a Faraday rotator mirror 62 with 50% output coupling. The output can be used for a variety of functions including synchronizing other lasers, seeding amplifiers, generating microwave signals, and facilitating other diagnostic applications. Due to the Faraday mirror 62, the light is reflected into the opposite polarization on its return through the fiber link 54. The light reflected back to the beam splitter 16 with orthogonal polarization states directly passes the polarizing beam splitter 16 and is reflected by polarizing beam splitter 16'.

The back-reflected pulse train is cross-correlated with the remaining pulse train from the mode-locked laser 12 in the balanced cross-correlator 10, including a periodically poled potassium-titanyl-phosphate (PPKTP) crystal as the combined nonlinear medium 26 and group dispersion/delay element 28, as described above. The cross-correlation signal produced by the balanced detector 38 is sent through a loop filter 61 and an amplifier 63 to drive, via a piezo-electric transducer (PZT), the fiber stretcher 60 and the nano-positioning stage 58 to stabilize the length of the fiber in the fiber link 54. In the setup shown in FIG. 9, the two pulsed output signals from the fiber link 54 are cross-correlated with respect to each other in an external cross-correlator 10' (in which the resulting signal produced by the balanced detector 38' is subject to an out-of-loop measurement) to monitor the relative link stability. Polarization rotation in the fiber link will be an issue. There exist commercially available polarization aligners, for example from Thorlabs, Inc. (of Newton, N.J., US), for stabilizing the polarization of the pulse streams from the fiber links. The polarization rotation can be tracked by control loops and half-wave and quarter-wave plates 48 and 64. The resolution of the cross-correlator will depend on the pulse width used.

In one exemplification, a single type-II phase-matched periodically poled $KTiOPO_4$ (PPKTP) crystal was used to construct a compact and self-aligned balanced optical cross-correlator for precise timing detection. The timing-error signal generated from this balanced cross-correlator, which was robust against intensity noise and temperature drifts, was used to stabilize a 310-meter-long fiber link. In a first experimental demonstration, long-term 10-fs level stabilization of the timing link was achieved.

The balanced cross-correlation included (a) generation of a group delay difference between two orthogonally polarized—otherwise identical—pulses, and (b) broadband second-harmonic generation (SHG) by a type-II phase-matched nonlinear crystal. Using the group delay resulting from the birefringence between the two orthogonal polarizations in the crystal enabled the implementation of balanced cross-correlation at the same wavelength. The detected signal was background free; i.e., if the pulses did not overlap in time, the detector signal vanished.

Figure 10:
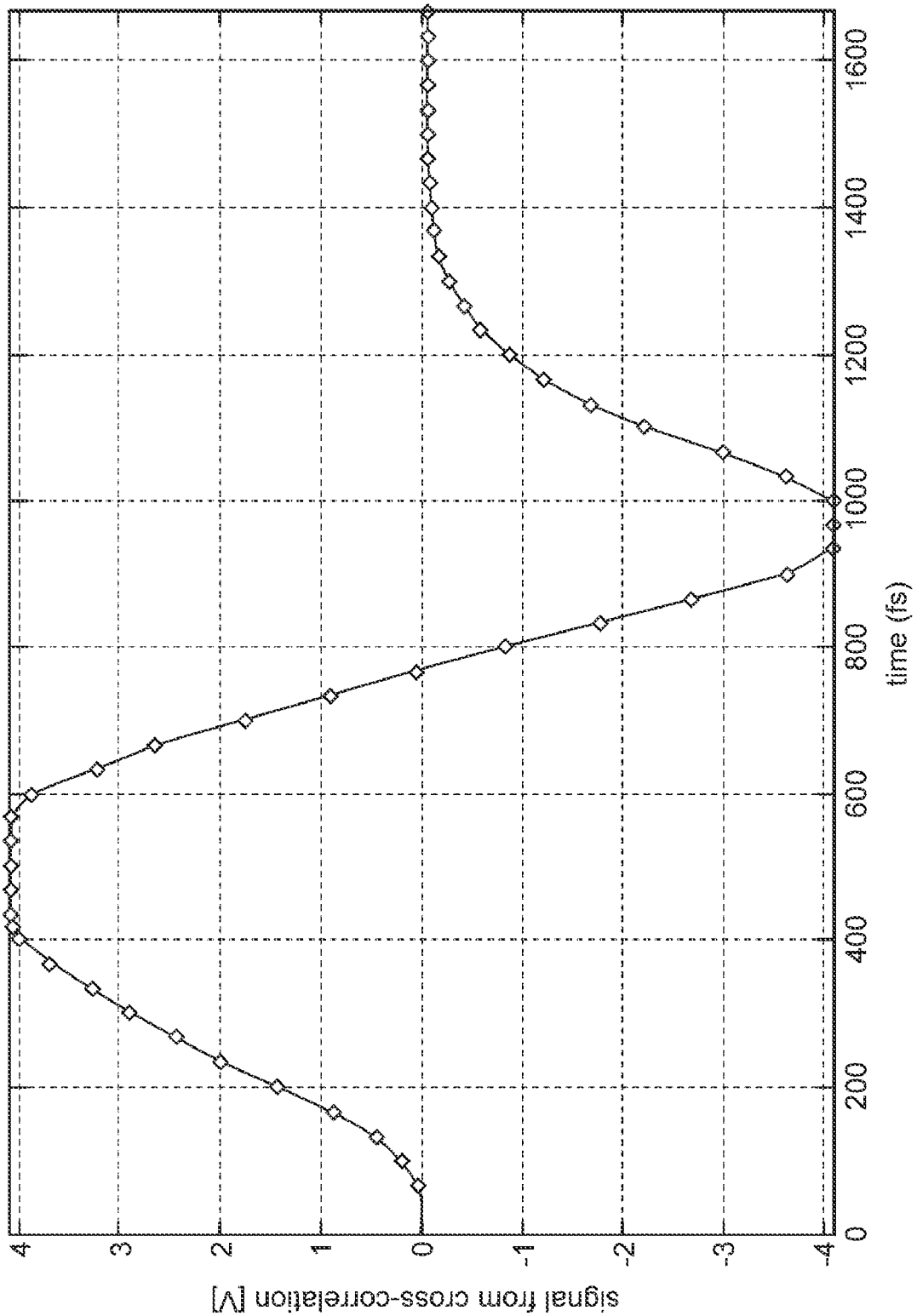
FIG. 10 charts an exemplification of balanced autocorrelation with a single-crystal balanced cross-correlator.

FIG. 10 shows the measured autocorrelation trace of a 77 pJ, 200-fs pulse at 1550 nm using a balanced cross-correlator (configured as shown in FIGS. 5 and 6) with a 4-mm long PPKTP crystal (with a poling period of 46.2 µm). The trace is clipped by the maximum output of the photodetector (4 V).

Figure 11:
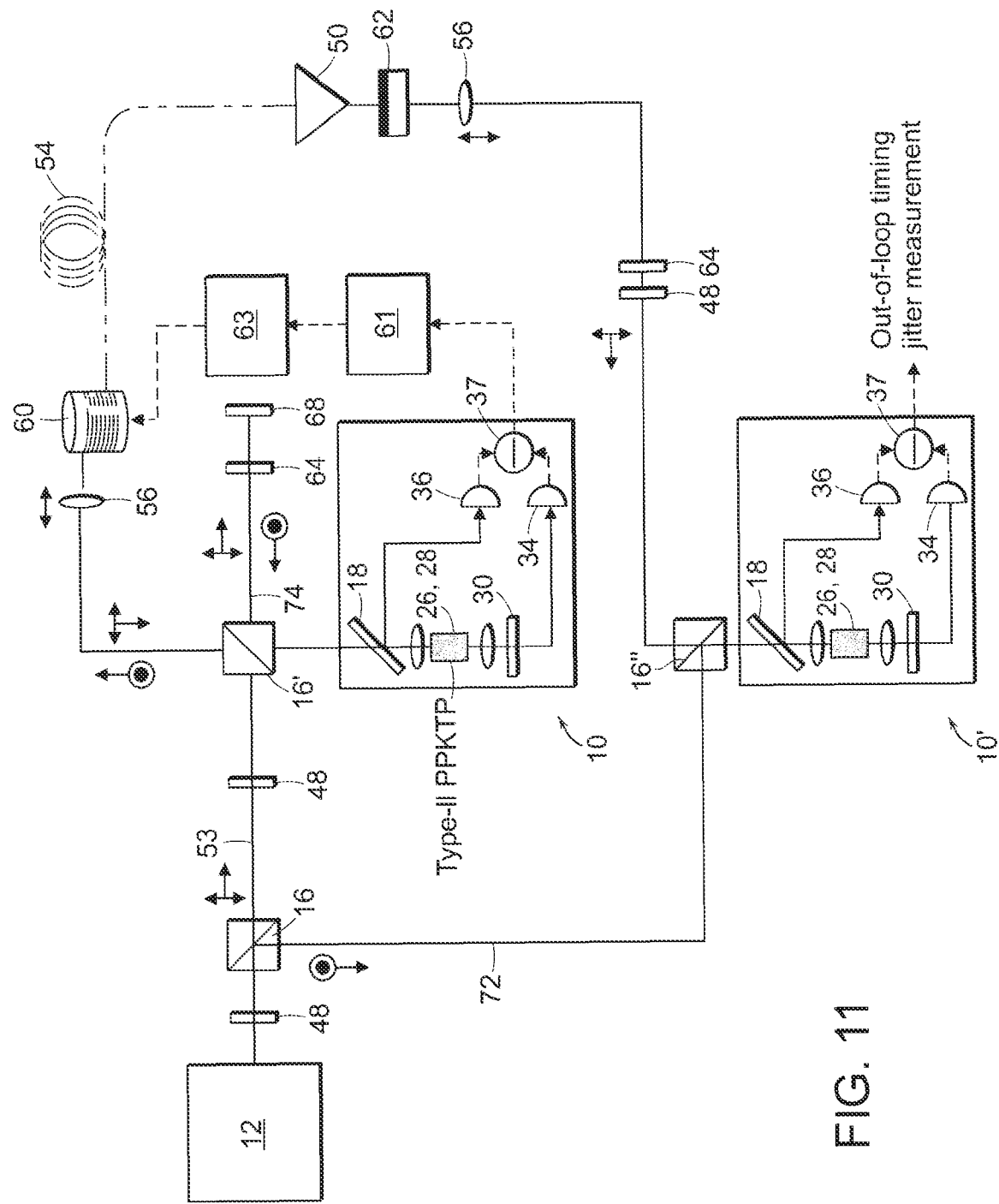
FIG. 11 is a schematic illustration an apparatus for timing link stabilization using a single-crystal balanced cross-correlator.

FIG. 11 shows a representation of an actual implementation of the general scheme of FIG. 9 for a 310-meter timing stabilized link using the single-crystal balanced cross-correlator. A 194-MHz soliton Er-doped fiber laser was used as the optical pulse source 12. The output power was 40 mW, and the pulsewidth was 200 fs. Part of the input pulse train was tapped off by a first polarizing beamsplitter cube 16 though an out-of-loop fiber link 72 to an out-of-loop characterization setup including a balanced cross-correlator 10' for generating an out-of-loop timing-jitter measurement (measuring timing jitter introduced, e.g., by fiber length fluctuations). The other part of the input pulse train was transmitted through a half-wave plate 48 in a fiber link 53 to a second polarizing beamsplitter cube 16'. A first portion of the input pulse train passed through the second polarizing beamsplitter cube 16', while a second portion of the input pulse train was reflected by the second beamsplitter cube 16' into a 310-meter-long dispersion-compensated fiber link 54.

The first portion of the input pulse train, which passed through the second polarizing beamsplitter cube 16', then passed through a quarter-wave plate 64 in a reference arm 74 to a silver mirror 68 that reflected the input pulse train and reversed its direction back through the quarter-wave plate 64 to the second polarizing beamsplitter cube 16', which then reflected the pulse train to the first balanced cross-correlator 10.

The second portion of the input pulse train, which was initially reflected by the second beamsplitter cube 16' to the 310-meter-long dispersion-compensated fiber link 54, passed through a piezoelectric fiber stretcher 60 for adjusting the length of the fiber link 54 based on feedback measurements from the first balanced cross-correlator 10. The fiber link 54 comprised approximately 40 meters of dispersion-compensating fiber (DCF) (dispersion value, $D_2 \approx 114.3$ $ps^2/km/nm$) and approximately 270 meter of single-mode fiber (SMF-28) ($D_2 \approx +17$ $ps^2/km/nm$). Half of the link-transmitted pulses were back-reflected by a 50:50 Faraday rotating mirror 62 at the end of the fiber link 54, while the other half of the link-transmitted pulses passed through and on to the out-of-loop timing-jitter measurement.

With the Faraday rotating mirror 62, the polarization state of the reflected pulses in the fiber link 54 was orthogonal to that of the input pulses, which enabled 100% transmission of the pulses toward the first balanced cross-correlator 10 when the pulses were transmitted back to the second polarizing beamsplitter cube 16' from the fiber link 54. Due to (a) the coupling loss of the collimator 56, (b) the splicing loss between the dispersion-compensating fiber and the SMF-28 fiber in the fiber link 54 and (c) the insertion loss inside the Faraday rotating mirror 62, the loss was more than 10 dB for the reflected pulses compared to the input pulses. To compensate those losses in the transmission, an Er-doped fiber amplifier 50 (EDFA) was used at the end of the fiber link 54.

Accordingly, the reflected pulses (with measured pulsewidths of approximately 420 fs) were combined with the fresh pulses from the laser 12 (passing first down and back through the reference arm 74) at the second polarizing beamsplitter cube 16'. The combined pulses were directed to the first balanced cross-correlator 10. The error signal generated from the balanced cross-correlator 10 was regulated by a loop filter 61 and applied to the piezoelectric fiber stretcher 60 in the fiber link 54 via a high-voltage piezoelectric driver 63 to close the timing-stabilization loop. When the timing-stabilization loop was locked, the timing fluctuations introduced to the fiber link 54 was compensated by the counteraction of the piezoelectric fiber stretcher 60. To evaluate the out-of-loop performances, a second balanced cross-correlator 10' was used to compare the transmitted pulses through the 310-meter link 54 with fresh pulses directly from the mode-locked laser 12. Accordingly, the second balanced cross-correlator 10' could test the timing synchronization in the loop for errors introduced, e.g., by changes in the length of the reference arm 74.

Figure 12:
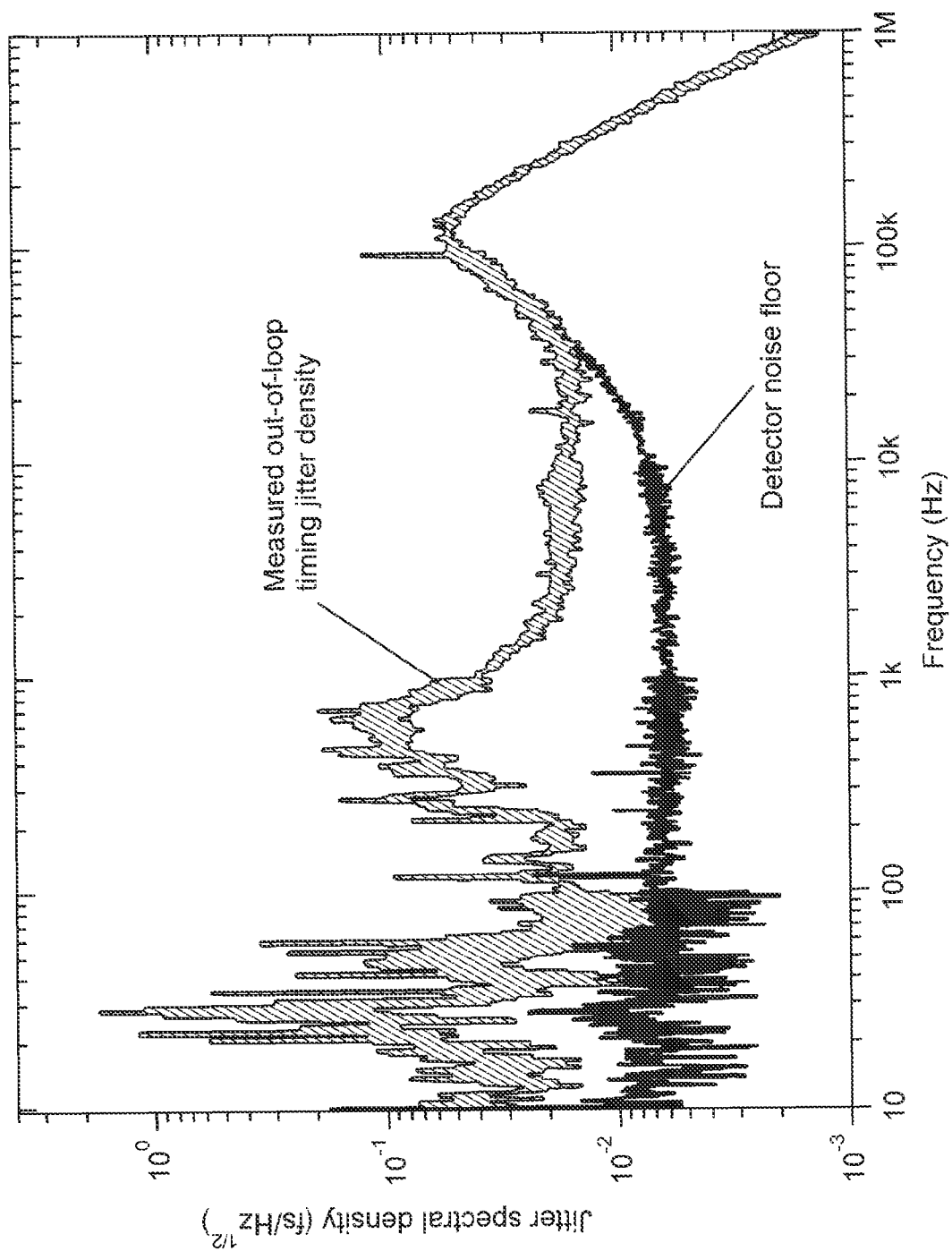
FIG. 12 charts the measured out-of-loop timing-jitter spectral density for the apparatus of FIG. 11.
Figure 13:
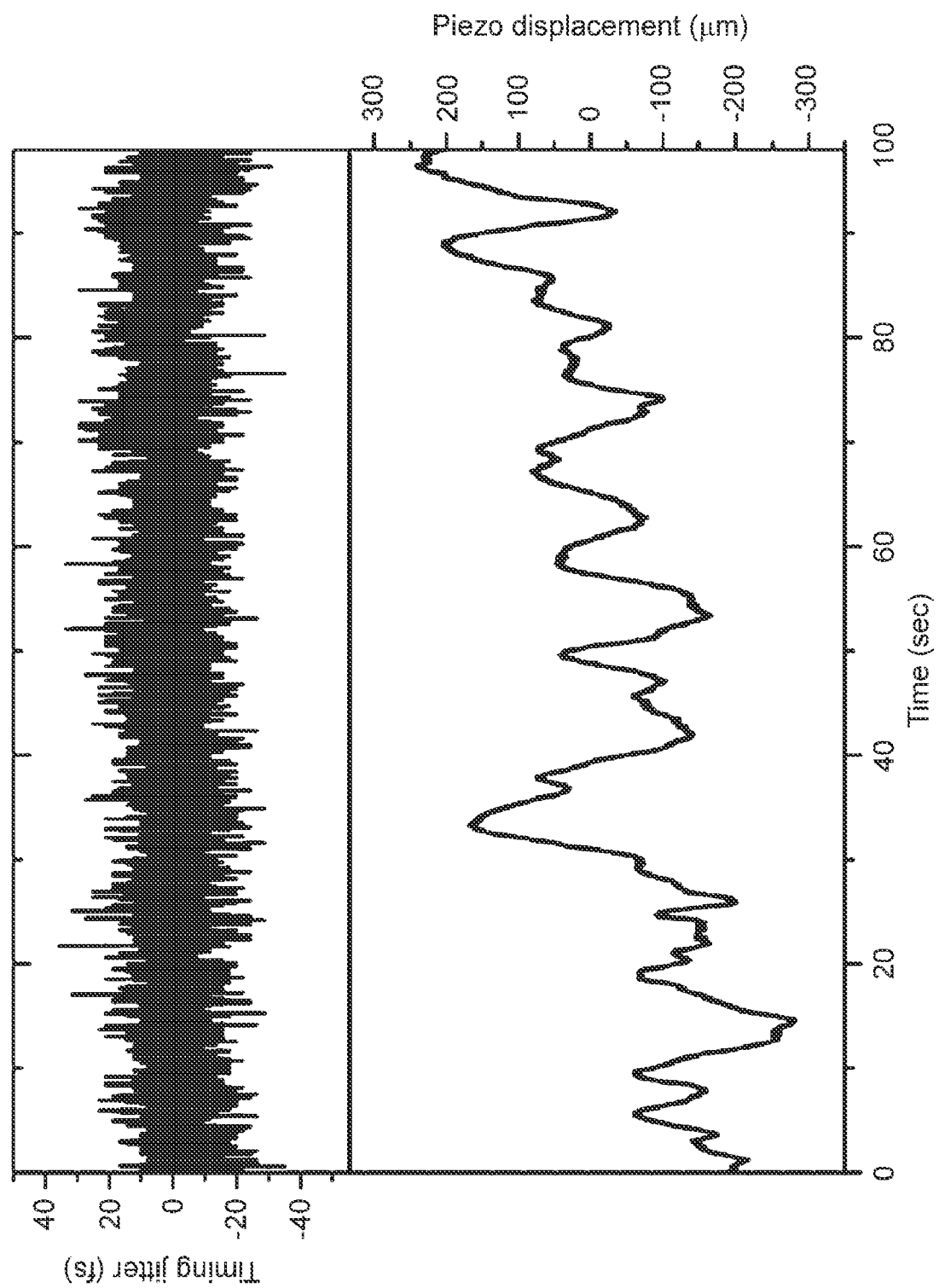
FIG. 13 charts the long-term out-of-loop timing-jitter trace (top trace) and piezoelectric stretcher displacement (bottom trace) over 100 seconds for the apparatus of FIG. 11.

FIGS. 12 and 13 summarize the measurement results of this stabilized fiber link. FIG. 12 shows the out-of-loop timing-jitter spectral density in units of fs/$\sqrt{Hz}$. The out-of-loop rms-timing jitter integrated from 10 Hz to 100 kHz (detector bandwidth) is 9.2 fs, where the detector background noise corresponds to 8.2 fs, which sets the limits in measurement accuracy. The top trace of FIG. 13 shows the long-term out-of-loop timing-jitter trace over 100 seconds measured with an oscilloscope. The rms-jitter over 100 seconds was 9.7 fs. The jitter analysis was mainly limited by the limited signal-to-noise ratio of the detection.

With a higher optical-power level and/or lower losses in the fiber link as well as lower-noise-balanced photodetectors, it is clearly possible to improve the locking performance as well as the measurement resolution. The bottom trace of FIG. 13 shows the displacement of the piezoelectric stretcher in the fiber link during the same time frame. The fiber link used in this experiment was not stabilized for temperature, vibration, or airflow; and the locking was broken purely by the limited displacement range of the piezoelectric fiber stretcher that was used (~700 µm, corresponding to $2 \times 10^{-6}$ length fluctuation of the whole fiber link). With additional manual adjustment of the translation stage, the lock was maintained for more than one hour. To the inventors' best knowledge, this result was the first long-term 10-fs-level stabilization of a fiber link of approximately 300-meter-length scale in a laboratory environment. This experiment also established that the addition of a motorized translation stage and polarization control at the end of the fiber can enable one to maintain this level of accuracy in synchronization for as long as is likely to be desired.

In summary, a self-aligned, single-crystal balanced cross-correlator comparing the timing between optical pulses at the same center wavelength was experimentally demonstrated. As a first application of this single-crystal balanced cross-correlator, long-term 10-fs precision stabilization of a 310-meter fiber link was demonstrated.

Figure 14:
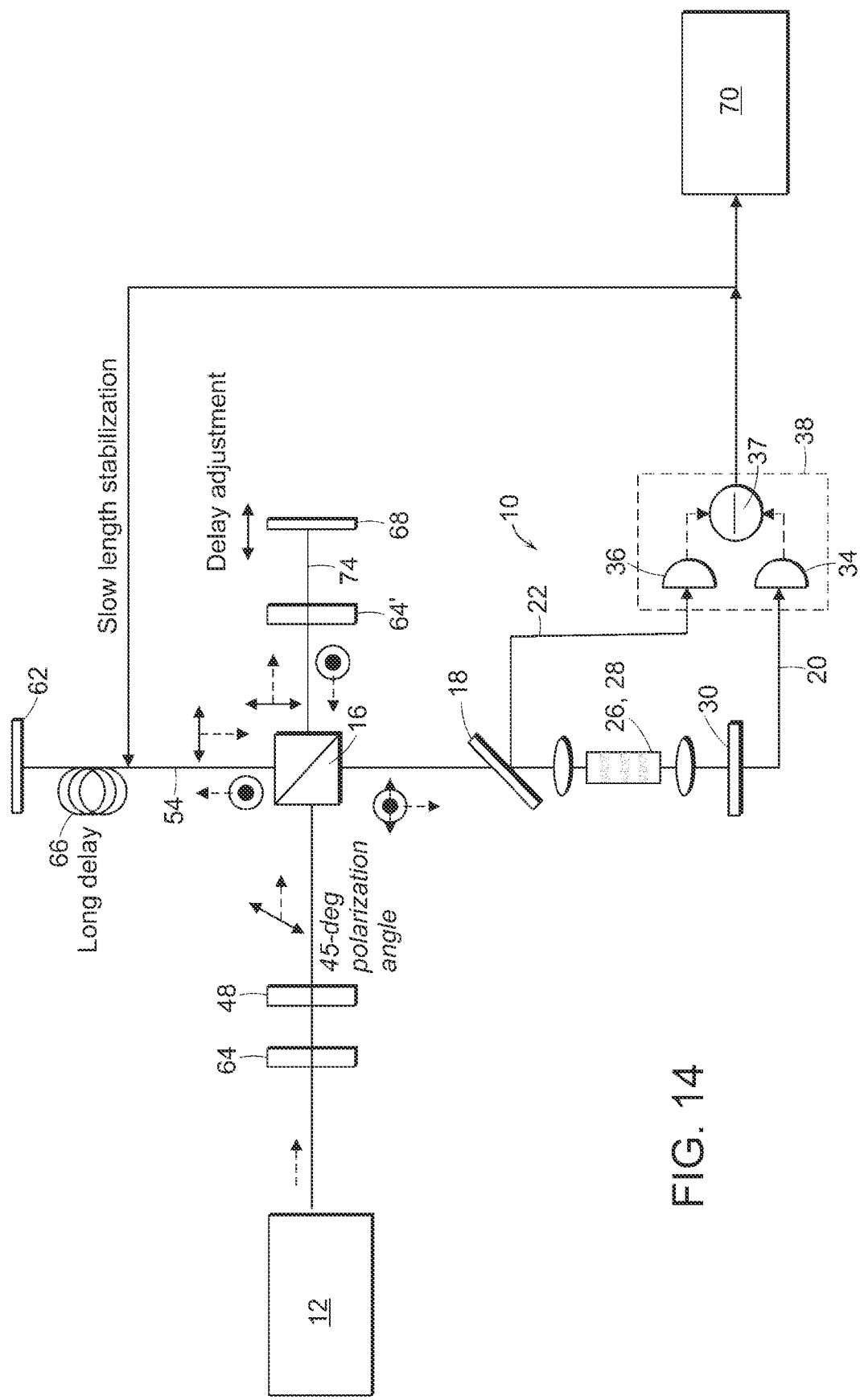
FIG. 14 is a schematic illustration of an apparatus for the high-frequency timing-jitter measurement of mode-locked lasers.

3) High-Frequency Timing-Jitter Measurement of Mode-Locked Lasers:

In the apparatus of FIG. 14, high-frequency timing jitter of a mode-locked laser 12 is measured by using a stabilized fiber link with a long spool of fiber 66 in one arm. In this embodiment, a pulse train is directed from a mode-locked laser 12 through a quarter-wave plate 64 and a half-wave plate 48 to a beamsplitter cube 16, which reflects a portion of the pulse train into fiber link 54 where it passes through the long spool 66 en route to a Faraday rotating mirror, which reflects a portion of that pulse train back to the beamsplitter cube 16. Another portion of the pulse train passes through the beamsplitter cube 16 into a reference arm 74 in which it passes through a quarter-wave plate 64' and to a delay adjustment mirror 68, which reflects the portion of the pulse train back to the beamsplitter cube 16. The pulse trains from the fiber link 54 and the reference arm 74 are reunited after their return trip to the beamsplitter cube 16 and passed/reflected to an arm with a cross-correlator 10.

Slow length stabilization can be performed via actuation of a piezoelectric stretcher (not shown) in the fiber link 54, such as via the stretcher 60 shown in FIG. 9. One can exploit the fact that the fiber-length fluctuations only occur at low frequencies (below 1 kHz) if the fiber spool 66 is properly shielded. The cross-correlator 10 stabilizes the fiber link to a fixed length, as described above. The loop, however, cannot follow the high-frequency timing jitter in the pulse train of the laser 12. Thus, the high-frequency noise at the output of the cross-correlator 10 (transmitted from the balanced detector 38 to a baseband RF analyzer 70) will directly reflect the high-frequency timing jitter of the laser source 12, which is otherwise very difficult to measure.

It has been shown, both theoretically and experimentally, that mode-locked solid-state lasers can generate optical pulse trains with ultralow timing jitter. Theory predicts that the timing jitter of such lasers at high frequencies (e.g., >100 kHz) is well below 1 fs. However, the characterization of timing jitter of free-running mode-locked lasers with attosecond-resolution is a highly nontrivial task. The accurate measurement of the fast noise dynamics in mode-locked lasers is important for optimization of lasers for high-precision applications such as photonic analog-to-digital converters, ultralow-noise microwave signal synthesis, large-scale optical timing distribution, and ultrahigh data-rate communications.

The use of optical cross-correlation is an attractive approach in measuring timing jitter with high sensitivity and sufficient detection range. This approach also does not involve excess noise in the photodetection. In particular, balanced optical cross-correlation can precisely extract the timing information without conversion of intensity noise into timing jitter. Since balanced optical cross-correlation measures the timing fluctuations between two optical pulses, it directly and accurately determines the timing jitter. Depending on the pulsewidth and the delay between the two signal paths in the balanced cross-correlator, the detection range can span from tens of femtoseconds to more than one picosecond, which provides enough detection range for measuring timing jitter of free-running lasers.

One exemplification demonstrated the characterization of the pulse timing-jitter spectral density of free-running mode-locked lasers with attosecond-resolution using balanced optical cross-correlation. Two different methods were demonstrated.

The first method, named the timing-detector method, is analogous to the phase-detector method (described in Agilent Technologies, "Phase Noise Characterization of Microwave Oscillator," Product Note 11729C-2) for phase noise characterization of microwave oscillators. The timing-detector method used a low-bandwidth (kHz range or lower) lock between the two mode-locked lasers and measured the relative timing jitter outside the locking bandwidth with a balanced cross-correlator.

The second method, named the timing-delay method, is the optical analog of the delay-line frequency discriminator method (described in Agilent Technologies, "Phase Noise Characterization of Microwave Oscillator," Product Note 111729C-2) used at microwave frequencies. The timing-delay method used a timing-stabilized and dispersion-compensated fiber link as a delay line and measured the timing jitter between the pulse reflected from the fiber end and the pulse from the laser with a balanced cross-correlator. Consequently, the timing jitter of the laser can be measured under test from $f_{delay}=1/T_{delay}$ to the Nyquist frequency, where $T_{delay}$ is the delay time between the two pulses. By combining these two methods, the timing-jitter spectral density of free-running mode-locked lasers was resolved with attosecond-resolution up to 10 MHz bandwidth.

Figure 15:
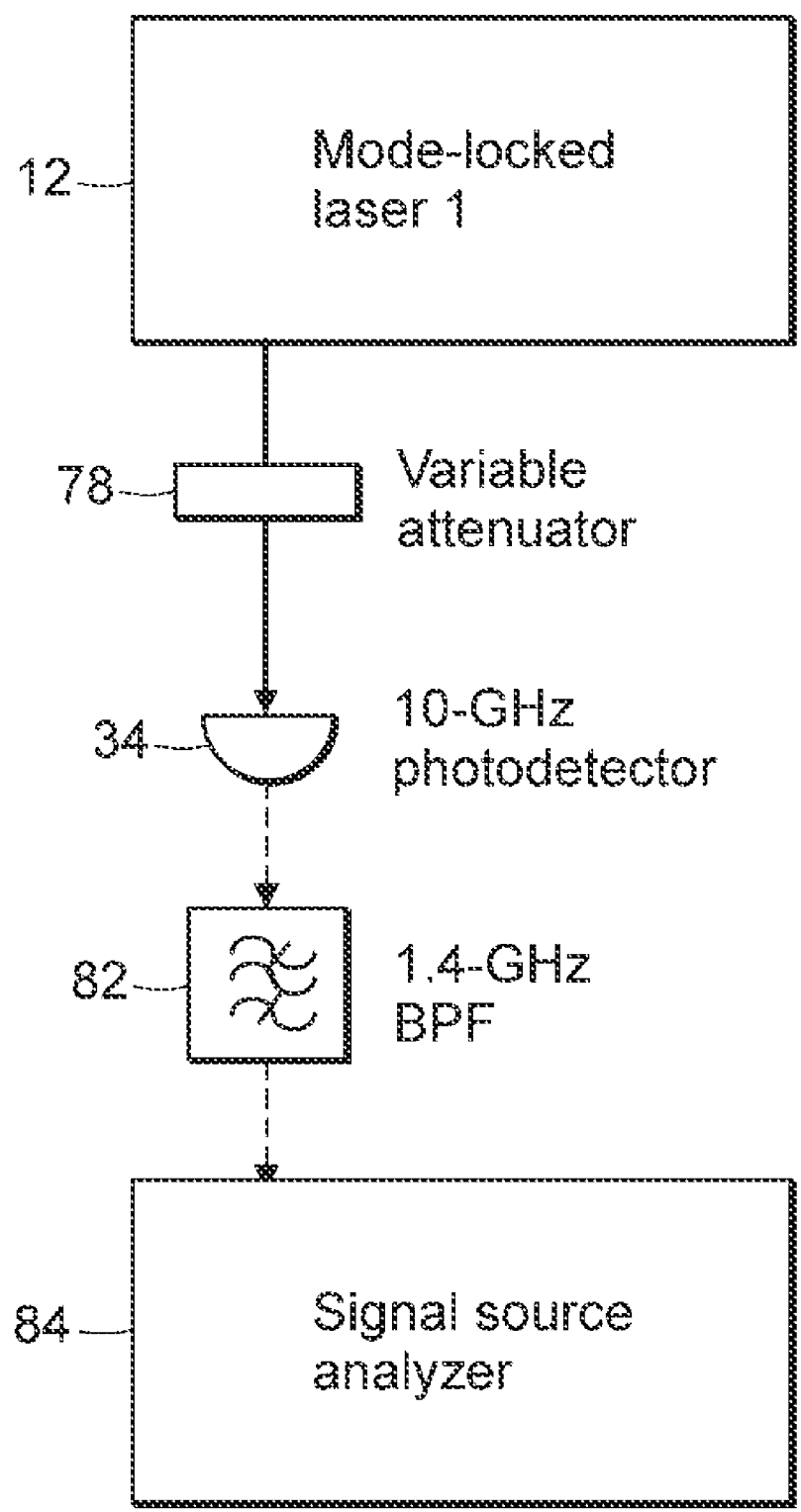
FIG. 15 illustrates an apparatus for measuring timing-jitter spectral density using a signal-source analyzer.
Figure 16:
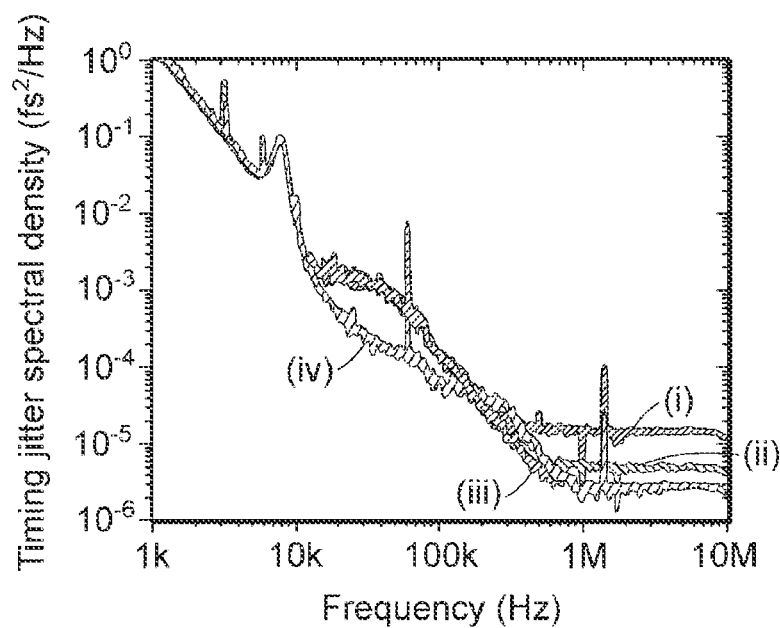
FIG. 16 charts the measurement results using the apparatus of FIG. 15; for curves (i), (ii) and (iii), the input optical power is 2 mW, 4 mW and 10 mW, respectively; curves (iii) and (iv) utilize different settings of the instrument when the input power is 10 mW.

For comparison with the conventional microwave-based technique, the timing-jitter spectral density was measured using a high-speed photodetector followed by a commercial signal-source analyzer (e.g., an E5052B Signal Source Analyzer from Agilent Technologies). The signal-source analyzer that was used had a low-noise tracking microwave oscillator synchronized to the oscillator-under-test by an internal phase-locked loop (PLL) to enable a direct noise measurement of microwave signals. FIG. 15 shows the configuration of the measurement apparatus including first laser 12, a 10-GHz photodetector 34, and a 1.4-GHz bandpass filter. FIG. 16 shows the collection of timing-jitter spectral-density measurements of a free-running 200-MHz Er-fiber laser ("M-Comb-Custom" from MenloSystems GmbH) as the first mode-locked laser 12 with different input optical-power and instrument settings. The phase noise of the 7th harmonic (1.4 GHz) of the fundamental repetition rate was measured. Depending on the input power and the instrument setting, the measured spectra above 10 kHz were significantly different. The high-frequency noise above 300 kHz depended on the input optical power as shown in curves (i), (ii) and (iii) in FIG. 16. The mid-frequency (10 kHz-200 kHz) noise shows a dependence on the instrument setting as shown in curves (iii) and (iv) in FIG. 16. These measurements indicate that even highly sophisticated commercial microwave techniques are limited in accuracy to ~10 fs by the combination of excess noise in photodetection, resolution of microwave mixers and phase noise of synthesizers and phase-locked loops.

To overcome the limitations set by microwave techniques, balanced optical cross-correlation was used to implement two independent measurement methods.

Figure 17:
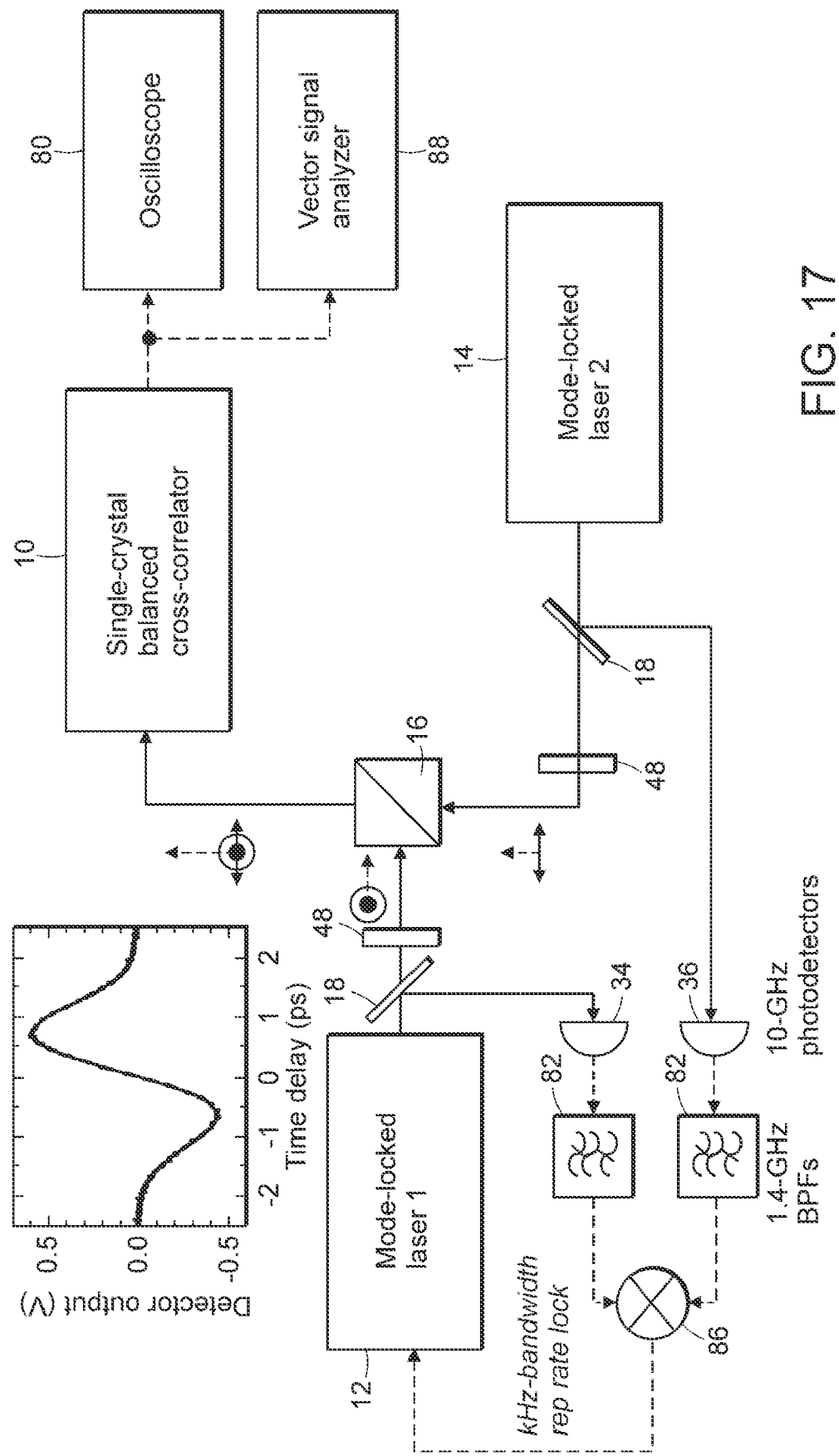
FIG. 17 is a schematic drawing of an apparatus performing a timing-detector method; the inset chart shows the balanced cross-correlation signal when the two lasers are not locked.

The first method, the timing-detector method, used a low-bandwidth lock between the two independent lasers 12 and 14 to measure the timing-jitter spectral density outside the locking bandwidth. Consequently, the sum of the free-running noise of the two lasers 12 and 14 could be measured. FIG. 17 shows a schematic of the apparatus for the timing-detector method. The laser under test (i.e., first laser 12) was a commercial 200-MHz Er-fiber laser. The laser used as a reference (i.e., second laser 14) was a 200-MHz soliton Er-fiber laser. Part of the output from each laser was tapped off and detected by 10-GHz InGaAs photodetectors 34 and 36. After bandpass-filtering by filters 82, the two 1.4 GHz signals beat with each other in a mixer 86, and the downconverted differential phase error from the mixer 86 was transmitted to a piezoelectric transducer in the first laser 12 to lock the repetition rates of the lasers 12 and 14.

By adjusting the relative delay between the two lasers 12 and 14, the locking point was placed at the linear detection regime of the balanced cross-correlation. The inset graph in FIG. 17 shows the output of the balanced cross-correlator 10 when the two lasers are not locked, as displayed by the oscilloscope 80. The balanced cross-correlator 10 was based on a single type-II phase-matched periodically poled $KTiOPO_4$ (PPKTP) crystal. The balanced photodetector in the cross-correlator 10 had a 3-dB bandwidth of 10 MHz. When the two lasers 12 and 14 were locked, the voltage-noise density from the output of the cross-correlator 10 was measured by a vector-signal analyzer 88. The voltage-noise spectral density was converted into the timing-jitter spectral density using the measured slope of the cross-correlation signal when the two lasers 12 and 14 were not locked.

Figure 18:
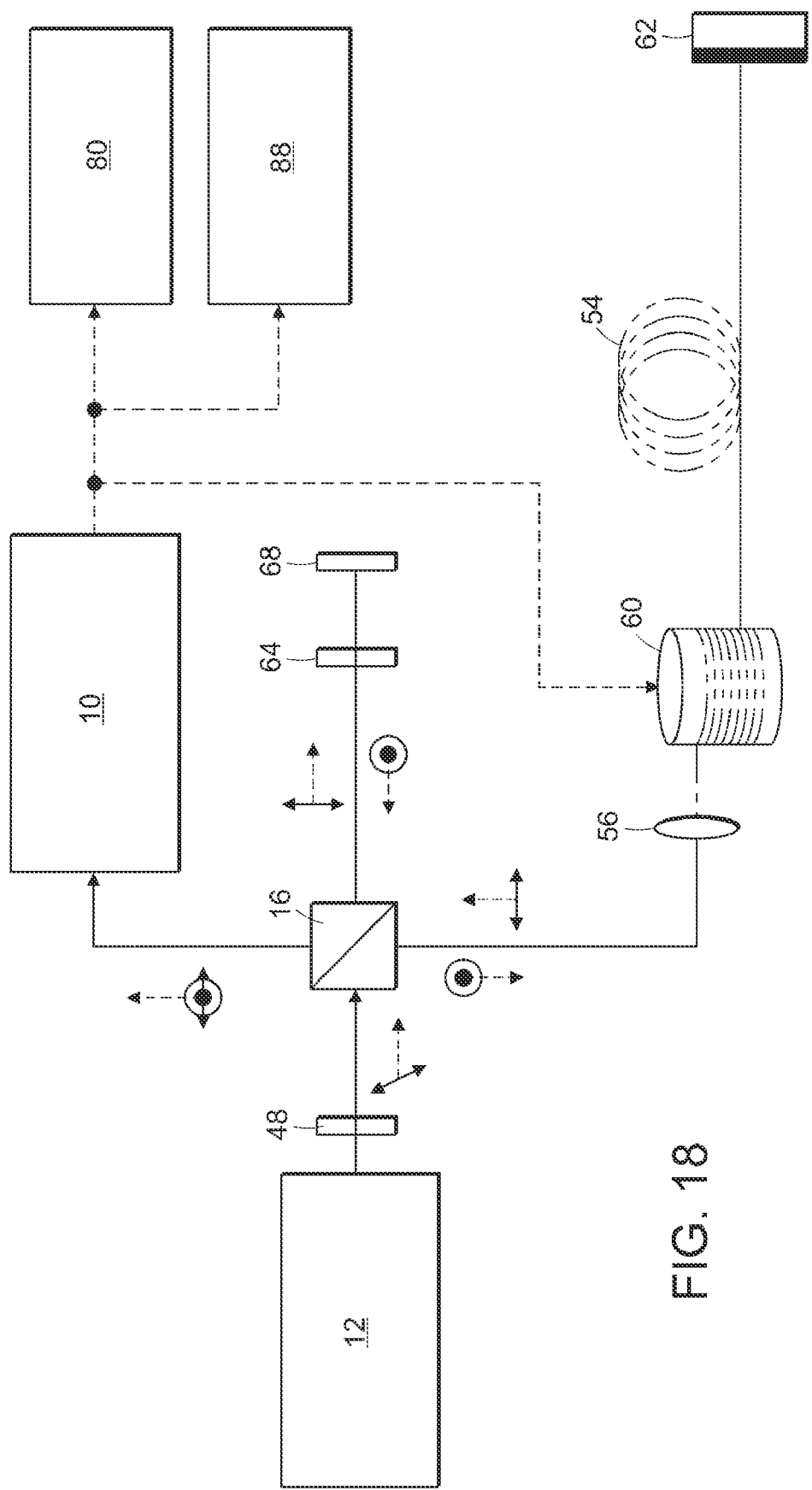
FIG. 18 is a schematic drawing of an apparatus performing a timing-delay method.

The second method, the timing-delay method, is illustrated in FIG. 18. A 10-MHz balanced photodetector was used in the cross-correlator 10 to monitor the noise in the high frequency range, and the output signal from the cross-correlator 10 was transmitted to a piezoelectric stretcher in the fiber link 54 to adjust the length of the fiber link 54. If the round-trip delay time of the fiber link 54 is $T_{delay}$, the timing jitter of the first laser 12 can be extracted in the frequency range above $f_{delay}=1/T_{delay}$ from this measurement. For the experiment, a 325-meter-long dispersion-compensated fiber link was used as the fiber link 54. The fiber link 54 was timing stabilized with 1-kHz bandwidth to prevent timing drift of the fiber link 54.

Figure 19:
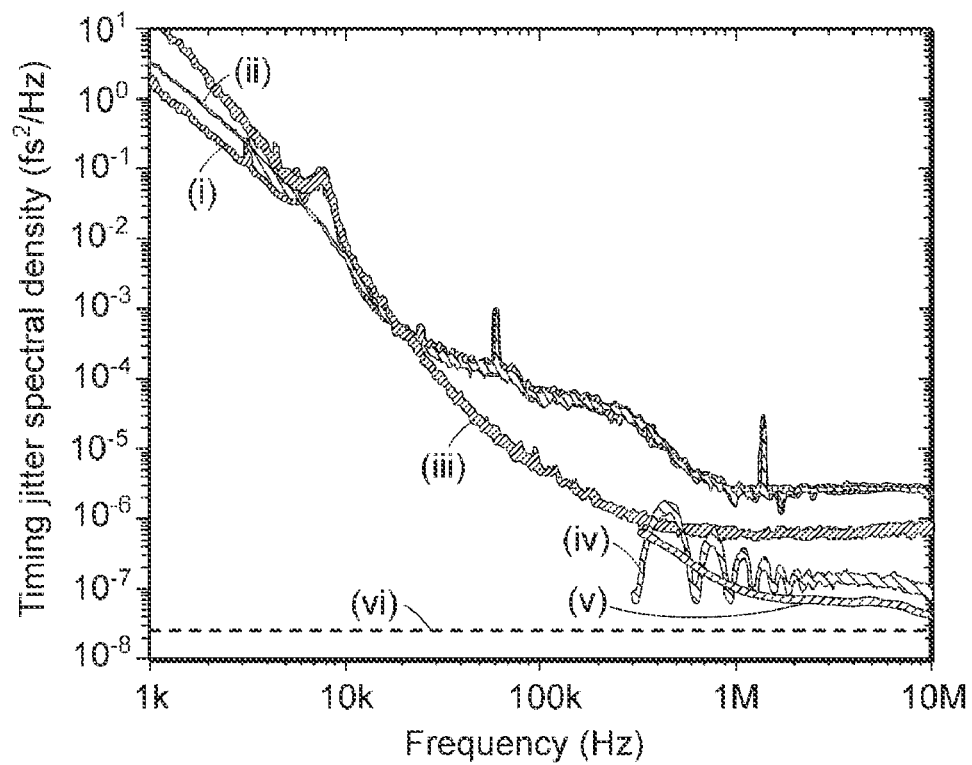
FIG. 19 is a chart of timing-jitter spectral-density measurement results; curves (i) and (ii) represent the results obtained with the signal-source analyzer for a first laser and for a second laser, respectively; curve (iii) represents the result obtained with the timing-detector method between the first and second lasers; curve (iv) represents the cross-correlation result obtained with the timing-delay method for the first laser; curve (v) represents the calculated jitter density result from the timing-delay method for the first laser; curve (vi) represents the shot noise limitation of the timing-delay method.

FIG. 19 summarizes the measurement results of the timing-jitter spectral density. Curves (i) and (ii) show the measurement results for the first and second lasers, respectively, when measured by the signal-source analyzer 84 (the schematic is shown in FIG. 15). As discussed with respect to FIG. 16, the result depends on the input optical power and instrument settings. For a fair comparison with the optical-cross-correlator-based measurement results, the best measurement results obtained with the signal-source analyzer are included in FIG. 19. In the 10-kHz-to-10-MHz range, the measured noise spectra [curves (i) and (ii)] of the first and second laser are almost identical, which suggests that these results might be already limited by the instrument resolution.

Curve (iii) in FIG. 19 shows the result obtained with the timing-detector method when the first and second lasers were synchronized with 2-kHz-bandwidth lock. The measured spectral density was dominated by the laser with the worse jitter properties. The characteristic spike at 8 kHz of the first laser is clearly captured both in curves (i) and (iii). The discrepancies in the lower frequency range (<5 kHz) arose from the feedback loop overshoot at the locking loop bandwidth at approximately 2 kHz. Above 20 kHz, the cross-correlation and signal-source-analyzer results show a significant difference, and the cross-correlation measurement indicates that the actual laser noise was much lower than the measured data using the signal-source analyzer. The timing-jitter density reaches $7\times10^{-7}$ fs$^2$/Hz at 500 kHz, and it becomes flat above that range. It turns out that the shot-noise floor at $4\times10^{-7}$ fs$^2$/Hz limits further measurement above 500 kHz.

Curve (iv) shows the cross-correlation result obtained with the timing-delay method using the round-trip delay from the 325-meter-long fiber link. The timing-jitter spectral density of the mode-locked laser, SAT (f), can be extracted by the relationship $2S_{\Delta t}(f)=S_{XC}(f)/[1-\cos(2\pi fT_{delay})]$, where $S_{XC}(f)$ is the cross-correlation power spectral density and $T_{delay}$ is the delay time. Curve (v) shows the calculated timing-jitter density of the first laser above 310 kHz. Curve (vi) shows the measured shot-noise limit of the timing-delay method, $2.2 \times 10^{-8}$ fs$^2$/Hz. This noise floor sets the limit of 470 as the resolution in 10-MHz bandwidth. Note that the detection was shot-noise limited because the measured thermal-noise floor of the photodetector was below $10^{-8}$ fs$^2$/Hz in the entire frequency range of interest.

By combining the results of curve (iii) in the 10-kHz-to-310-kHz range and curve (v) in the 310-kHz-to-10-MHz range, the upper limit for the integrated timing jitter of the first laser can be extracted as 0.72 fs, 1.02 fs and 5.19 fs in the 1-MHz-to-10-MHz, 100-kHz-to-10-MHz, and 10-kHz-to-10-MHz ranges, respectively. In comparison, the signal-source analyzer gave 4.93 fs, 6.10 fs and 8.07 fs over the same frequency ranges, respectively, which are mainly limited by the noise resolution limit at $3 \times 10^{-6}$ fs$^2$/Hz in the 1-MHz-to-10-MHz range.

In summary, attosecond-resolution characterization techniques were demonstrated for measuring the high-frequency timing jitter of free-running mode-locked lasers in a simple and direct way using balanced optical cross-correlation. The first measurement confirms that mode-locked solid-state lasers indeed have subfemtosecond-level high-frequency timing jitter. The demonstrated shot-noise limited resolution was $2.2 \times 10^{-8}$ fs$^2$/Hz. By optimizing the cross-correlation efficiency, for example, by using aperiodically poled lithium niobate waveguides, the resolution can be significantly improved. Although the demonstration in this exemplification is based on the Er-fiber lasers and the PPKTP-based cross-correlators at 1550 nm, this technique can be extended to the characterization of other mode-locked lasers and wavelength ranges using appropriate nonlinear crystals and delay elements in the balanced cross-correlator.

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/20^{th}$, $1/10^{th}$, $1/5^{th}$, $1/3^{rd}$, $1/2$, etc, or by rounded-off approximations thereof, within the scope of the invention unless otherwise specified. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention. The contents of all references, including patents and patent applications, cited throughout this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

What is claimed is:

1. A method for precise detection of the timing error between laser pulses, the method comprising:
   directing first and second input pulses through a nonlinear medium and a group dispersion/delay element, generating a first-pass sum-frequency component from the first and second input pulses and changing the relative positions of the first and second input pulses;
   directing the first-pass sum-frequency component and the first and second input pulses to an inline dichroic mirror that passes the sum-frequency component and reflects the first and second input pulses;
   detecting the energy of the sum-frequency component that passed through the inline dichroic mirror;
   directing the reflected first and second input pulses back through the group dispersion/delay element and nonlinear medium, changing the relative positions of the first and second input pulses and generating a second-pass sum-frequency component from the reflected first and second input pulses;
   detecting the energy of the second-pass sum-frequency component; and
   comparing the energy of the first-pass sum-frequency component with the energy of the second-pass sum-frequency component to determine the relative positions of the first and second input pulses.

2. The method of claim 1, further comprising directing the second-pass sum-frequency component to an off-axis dichroic mirror that passes the first and second input pulses but reflects the second-pass sum-frequency component before its energy is detected.

3. The method of claim 2, further comprising directing the first and second input pulses through the off-axis dichroic mirror before the first pass of the first and second input pulses through the nonlinear medium.

4. The method of claim 3, wherein the first and second input pulses are directed along a single path between the dichroic mirrors, wherein the first-pass sum-frequency component is directed along the single path on one side of the nonlinear medium, and wherein the second-pass sum-frequency component is directed along the single path on a side of the nonlinear medium opposite to that of the first-pass sum-frequency component.

5. The method of claim 4, wherein the single path runs through an optical fiber.

6. The method of claim 1, further comprising passing both the first and second sum-frequency components through a filter before they are detected.

7. The method of claim 6, wherein the nonlinear medium also generates a second-harmonic component with each pass of the first and second input pulses, and wherein the filter removes the second-harmonic components while it passes the sum-frequency components.

8. The method of claim 1, further comprising focusing the first and second input pulses before each passes into the non-linear medium.

9. The method of claim 1, wherein the first-pass and second-pass sum-frequency components are detected with respective photodiodes.

10. The method of claim 9, wherein the photodiodes are included in a balanced detector that measures the difference in voltages or currents generated by the respective photodiodes.

11. The method of claim 10, wherein the first input pulse is generated by a first laser and wherein the second input pulse is generated by a second laser.

12. The method of claim 11, further comprising adjusting the distance traveled by the first input pulse or by the second input pulse before its first pass through the nonlinear medium as a function of the difference measured by the balanced detector to reduce the timing error between the first and second input pulses.

13. The method of claim 1, wherein the first and second input pulses have different center frequencies.

14. The method of claim 13, wherein the first and second input pulses have the same polarization.

15. The method of claim 13, wherein the nonlinear medium is a type-I phase-matched nonlinear crystal.

16. The method of claim 1, wherein the first and second input pulses have different polarizations.

17. The method of claim 16, wherein the polarizations of the first and second input pulses are orthogonal.

18. The method of claim 16, wherein the first and second input pulses have the same center frequency.

19. The method of claim 16, wherein the nonlinear medium is a type-II phase-matched nonlinear crystal.

20. The method of claim 1, wherein the nonlinear medium is contained in a waveguide or a waveguide is fabricated in the nonlinear medium, wherein the first and second input pulses pass through different inputs into the nonlinear medium and adopt different waveguide modes, and wherein the waveguide modes have different group velocities.

21. The method of claim 20, wherein the nonlinear medium includes at least one of periodically poled lithium niobate and aperiodically poled lithium niobate.

22. The method of claim 20, wherein the material is periodically poled potassium-titanyl-phosphate and the input pulses are in different polarizations.

23. The method of claim 20, wherein the first and second input pulses are fiber coupled to the waveguides and the dichroic mirrors are in the form of coatings on the waveguides and wavelength-dependent fiber couplers.

24. The method of claim 23, wherein the energies of the sum-frequency components are detected and compared in a balanced detector, and wherein the balanced detector is fiber coupled to the waveguides.

25. The method of claim 1, wherein the nonlinear medium and the group dispersion/delay element are the same medium.

26. The method of claim 1, wherein the nonlinear medium and the group dispersion/delay element are distinct.

27. The method of claim 1, wherein the group dispersion/delay element changes the relative positions of the of the first and second input pulses based on at least one of the following: differences in refractive indices for the first and second input pulses, different polarization for the first and second input pulses, and occupation of different spatial modes by the first and second input pulses.

28. An apparatus for precise detection of a timing error between laser pulses, the apparatus comprising:
a first laser for generating a first input pulse;
a second laser for generating a second input pulse;
a first optical path extending from the first laser for transmitting the first input pulse;
a second optical path extending from the second laser for transmitting the second input pulse and intersecting the first optical path;
a balanced detector for detecting and comparing a pair of optical pulses;
a joint optical path extending between the balanced detector and the intersection of the first and second optical paths;
at least one material serving as a sum-frequency-generating nonlinear medium and as a group dispersion/delay element positioned in the joint optical path;
an inline dichroic mirror designed to transmit to the balanced detector a first-pass sum-frequency component generated by the nonlinear medium from the first and second input pulses on a first pass traveling away from the lasers, wherein the inline dichroic mirror is further designed to reflect the first and second input pulses along the joint optical path back toward the lasers;
an off-axis dichroic mirror positioned in the joint optical path between the nonlinear medium and the intersection of the first and second optical paths and designed and oriented to reflect a second-pass sum-frequency component generated by the nonlinear medium from the first and second input pulses on a second pass traveling back toward the lasers, while transmitting the first and second input pulses along the joint optical path, wherein the off-axis dichroic mirror is oriented to reflect the second-pass sum-frequency component out of the joint optical path; and
an extension optical path extending from the off-axis dichroic mirror and positioned to transmit the second-pass sum-frequency component from the off-axis dichroic mirror to the balanced detector.

29. The apparatus of claim 28, further comprising a piezoelectric actuator coupled with the first or second laser and in electronic communication with the balanced detector such that the actuator can reposition the input pulses from the first or second laser based on communications from the balanced detector.

30. The apparatus of claim 28, further comprising a halfwave plate positioned in the first or second optical path for changing the polarization of the first or second input pulse.

31. The apparatus of claim 28, wherein the optical paths pass through optical fibers.

32. The apparatus of claim 31, further comprising a fiber stretcher in the first or second optical path and in communication with the balanced detector so that it can change the length of the first or second optical path based on a communication from the balanced detector.

33. The apparatus of claim 28, further comprising at least one filter positioned in the joint optical path between the inline dichroic mirror and the balanced detector and in the extension optical path, wherein the filter can remove a second-harmonic component while transmitting a sum-frequency component to the balanced detector.

34. The apparatus of claim 28, wherein the same material serves as the sum-frequency-generating nonlinear medium and as the group dispersion/delay element.

35. The apparatus of claim 28, wherein the sum-frequency-generating nonlinear medium and the group dispersion/delay element are distinct.

36. The apparatus of claim 28, wherein the group dispersion/delay element is selected from a birefringent material and a dispersive material.

* * * * *